US011186063B2

(12) United States Patent
Piana et al.

(10) Patent No.: US 11,186,063 B2
(45) Date of Patent: Nov. 30, 2021

(54) LAPPED NONWOVEN WITH ATTACHABLE BACKING AND APPLICATIONS THEREOF

(71) Applicant: Piana Nonwovens, Cartersville, GA (US)

(72) Inventors: Andrea Piana, Cartersville, GA (US); Mehran Jafari, Cartersville, GA (US); Eric McCann, Cartersville, GA (US); Sam Lim, Cartersville, GA (US); Andy Hollis, Cartersville, GA (US); Helias Andriessen, Cartersville, GA (US)

(73) Assignee: PIANA NONWOVENS, Cartersville, GA (US)

( * ) Notice: Subject to any disclaimer, the term of this patent is extended or adjusted under 35 U.S.C. 154(b) by 219 days.

(21) Appl. No.: 16/247,907

(22) Filed: Jan. 15, 2019

(65) Prior Publication Data
US 2019/0248103 A1    Aug. 15, 2019

Related U.S. Application Data

(60) Provisional application No. 62/617,839, filed on Jan. 16, 2018.

(51) Int. Cl.
*B32B 5/02* (2006.01)
*B32B 5/26* (2006.01)
(Continued)

(52) U.S. Cl.
CPC ............... *B32B 5/022* (2013.01); *B32B 5/26* (2013.01); *B32B 37/14* (2013.01); *D04H 1/5412* (2020.05);
(Continued)

(58) Field of Classification Search
CPC ....................................................... B32B 5/02
See application file for complete search history.

(56) References Cited

U.S. PATENT DOCUMENTS

| | | | | |
|---|---|---|---|---|
| 5,691,036 A | * | 11/1997 | Lin | B32B 5/26 428/172 |
| 5,834,385 A | * | 11/1998 | Blaney | B01J 20/28023 442/382 |

(Continued)

*Primary Examiner* — Andrew T Piziali
(74) *Attorney, Agent, or Firm* — W&C IP

(57) ABSTRACT

A fibrous nonwoven material which is vertically lapped in its entirety or which includes one or more lapped regions which include vertically lapped fibers provides for padding to be applied to a substrate (e.g., an article of interest such as a handle for sporting equipment or tool, or on the inside of a motorcycle or bicycle helmet, etc.). The skin contacting surface of the nonwoven has regions which are relatively thicker than other regions, and air, sweat, and the like are allowed to easily pass through these regions for cooling, wicking of fluid and enhanced breathability. The lapped nonwoven includes a backing material which helps define the pad shape and which permits securing to a substrate. A hook and loop fastener may be affixed to the lapped nonwoven at the backing material so as to allow retrieval and replacement of the nonwoven on the substrate. An acquisition layer on the surface can be used on the surface of the nonwoven, and a carded consolidated web may be positioned within the nonwoven. The nonwoven may take a variety of shapes including the shape of a strip and the shape of a koozie.

23 Claims, 5 Drawing Sheets

(51) Int. Cl.
*D04H 1/76* (2012.01)
*B32B 37/14* (2006.01)
*D04H 11/04* (2006.01)
*D04H 1/541* (2012.01)

(52) U.S. Cl.
CPC ............. *D04H 1/5418* (2020.05); *D04H 1/76* (2013.01); *D04H 11/04* (2013.01); *B32B 2597/00* (2013.01)

(56) References Cited

U.S. PATENT DOCUMENTS

| | | | | |
|---|---|---|---|---|
| 6,093,665 | A * | 7/2000 | Sayovitz | D04H 1/559 442/394 |
| 6,277,469 | B1 * | 8/2001 | Wildeman | B32B 5/06 428/167 |
| 2004/0180177 | A1 * | 9/2004 | Ray | B32B 27/12 428/86 |
| 2005/0006173 | A1 * | 1/2005 | Albin, Jr. | D04H 1/74 181/290 |
| 2005/0275253 | A1 * | 12/2005 | Priebe | A47C 7/74 297/180.14 |
| 2006/0076106 | A1 * | 4/2006 | McGuire | D04H 1/70 156/272.2 |
| 2007/0152488 | A1 * | 7/2007 | York | A47C 31/007 297/411.2 |
| 2015/0013039 | A1 * | 1/2015 | Parker | A41D 13/0512 2/2.5 |

* cited by examiner

LAPPED NONWOVEN WITH ATTACHABLE BACKING AND APPLICATIONS THEREOF

CROSS-REFERENCE TO RELATED APPLICATIONS

This application claims priority to U.S. Provisional Application 62/617,839 filed on Jan. 16, 2018. The complete contents thereof is herein incorporated by reference.

FIELD OF THE INVENTION

The present invention pertains to vertically lapped (perpendicular-laid) nonwovens with high elastic recovery and absorbency to replace foam in padding applications, particularly applications that are touched by or in contact with the human body.

BACKGROUND

Moisture management is an important factor to consider for providing sufficient comfort in textiles and outdoor apparel and sport equipment. Fabric touching the human skin should be able to transport the moisture from skin to in order to keep the skin dry.

Many sporting equipment devices use foam materials to create comfort due to its elasticity and adaptability to different shapes and contours. For example, ski goggles and helmets use pads made of foam between the frame and human body to increase comfort.

Despite offering good resiliency, foam materials are relatively poor in moisture transport and are not "breathable", which translates to accumulation of sweat and body fluids on foam in contact with skin. In addition, foam materials are not environmentally friendly and emit volatile organic compounds (VOCs) which can be harmful to human health.

A "nonwoven" is a manufactured sheet, web, or batt of natural and/or man-made fibers or filaments that are bonded to each other by any of several means. Manufacturing of nonwoven products is well described in "Nonwoven Textile Fabrics" in Kirk-Othmer Encyclopedia of Chemical Technology, 3rd Ed., Vol. 16, July 1984, John Wiley & Sons, p. 72~124 and in "Nonwoven Textiles", November 1988, Carolina Academic Press. Web bonding methods include mechanical bonding (e.g., needle punching, stitch, and hydro-entanglement), chemical bonding using binder chemicals (e.g., saturation, spraying, screen printing, and foam), and thermal bonding using binder fibers with low-melting points. Two common thermal bonding methods are air heating and calendaring. In air heating, hot air fuses low-melt binder fibers within and on the surface of the web to make high-loft nonwoven. In the calendaring process, the web is passed and compressed between heated cylinders to produce a low-loft nonwoven.

SUMMARY

An object of the invention is to use a nonwoven instead of a foam material in applications (e.g., sporting equipment, tools, etc.) where a human comes into contact with the nonwoven (e.g., on the handle of a sporting equipment, tools, etc.). Nonwovens offer numerous advantages over foam materials, including without limitation recyclability, high cushioning, high resiliency, lower weight, higher breathability, and excellent mechanical properties. They are also very versatile and can be tuned for different performance by selection on of fibers blending in the nonwoven and in the configuration of the nonwoven. Nonwovens made of polyester fiber are odorless and do not emit volatile organic compounds.

Vertically/or perpendicular lapped nonwoven (v-lap) are made by folding or pleating of web of randomly oriented fibers. Laps or folds are oriented in a vertical (Z) direction and provide high resiliency upon compression. In v-lap nonwovens or nonwovens with sections containing v-lap nonwoven material, as fibers are randomly oriented and bonded together, fibers can compress and reduce fiber-to-fiber distance upon compression and go back to original orientation after removal of force.

Vertically lapped nonwovens are light weight, porous and highly air permeable. Extra air permeability and moisture transport can achieved by folding and bonding the nonwoven together to create channels through the thickness of the nonwoven, in addition to that which is provided by the voids and gaps between the fibers.

An object of the invention is to provide a device, e.g., in the form of a strip, which has a nonwoven material with one or more lap regions, and a backing material, which is securable to a substrate of interest, e.g., a handle of a tool or sporting equipment, the inside of a helmet, etc. The lap regions include vertically lapped nonwoven, and may be of a thickness that is less than surrounding regions of the nonwoven material. When connected to a product of interest, e.g., tennis racket, helmet, etc., the device of the present invention allows for superior cooling, as well as wicking and channeling of sweat. Having hook and loop fastener elements secured to the backing material enables the device to be selectively placed on a product of interest, and then retrieved, and replaced at the same or another location on the product of interest. Further improvements include the use of an acquisition layer on the surface of the nonwoven, and the use of carded consolidated web within the nonwoven. Alternative configurations may include a koozie design which can be slipped over a handle.

DESCRIPTION OF THE DRAWINGS

FIG. 6A shows the acquisition layer stretched over the nonwoven and FIG. 6B shows the acquisition layer being vertically lapped to match the vertically lapped regions in the nonwoven;

DETAILED DESCRIPTION

Figure 1B:
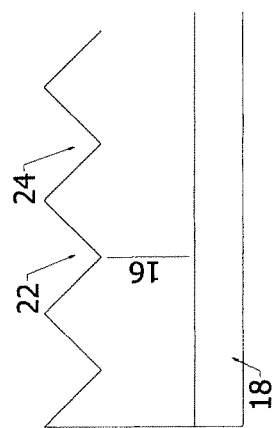
FIG. 1B is a cross-sectional side view of the lapped nonwoven material of FIG. 1A.

Embodiments of this invention pertain to padding applications which vertically lapped nonwoven material instead of foam materials. These embodiments benefit from an absorbency/breathability, as well as a cushioning functionality which can be achieved with v-lap non-wovens. Pad made with v-lap non-wovens according to the invention have particular utility in applications where the pad comes into direct contact with human skin (e.g., padding inside a motorcycle or bicycle helmet; padding inside a hat such a baseball cap; padding on sporting equipment handles such as tennis rackets, ski poles, golf clubs, etc.; padding on a handle of a hand tool; padding on a handgrip; etc.).

All or portions of the nonwoven are "vertically lapped". In the preferred embodiment "lapping" of the nonwoven occurs before the thermobonding of the web using a "vertical lapper". A "vertical lapper" is sometimes referred to as a "STRUTO" or a "V-LAP". WO 2015176099 to Cooper, US Patent Application 20080155787 to Cooper, and U.S. Pat. No. 7,591,049 to Cooper each of which are herein incorporated by reference, show examples of machinery which may be used to make vertically lapped nonwovens for use in the invention. Vertically lapped nonwovens are typically lighter in weight than conventional nonwovens (which are generally horizontally lapped), and are very flexible making them easier to mold than conventional nonwovens. Vertically lapped nonwovens can provide cushioning equivalent or better than polyurethane foams, but at half the weight or lower.

The fibers in the nonwoven can be wide ranging depending on the application and can be natural or man-made. The nonwoven can include combinations of two or more different natural fibers; two or more different man-made (synthetic) fibers; blends containing one or more natural fibers and one or more man-made fibers. Exemplary cellulosic fibers (generally natural, but could be modified to be man-made) which can be used in the practice of the invention include but are not limited to cotton, kapok, flax, ramie, kenaf, abaca, coir, hemp, jute, sisal, and pineapple, rayon, bamboo fiber, Tencel®, and Modal® fibers. Other fibers which may be used in the practice of the invention include glass fibers, basalt fibers, Kevlar™ fibers, aramid fibers, polyester fibers (e.g., which can function both as a binder fiber, but, depending on the polyester, as part of the non-woven blend), flax, wool (which may be obtained, for example, from one of the forty or more different breeds of sheep, and which currently exists in about two hundred types of varying grades), silk, RAYON® (a man-made fiber that may include VISCOSE RAYON® and CUPRAMMONIUM RAYON®), acetate (a man-made fiber), NYLON® (a man-made fiber), acrylic (a man-made fiber), polyester (a man-made fiber), triacetate (a man-made fiber), SPANDEX® (an elastomeric man-made fiber), polyolefin/polypropylene (man-made olefin fibers), microfibers and microdeniers, lyocell (a man-made fiber), vegetable fiber (a textile fiber of vegetable origin, such as cotton, kapok, jute, ramie or flax), vinyl fiber (a manufactured fiber), alpaca, angora, carbon fiber (suitable for textile use); (t) glass fiber (suitable for textile use), raffia, ramie, vinyon fiber (a manufactured fiber), VECTRAN® fibers (manufactured fiber spun from CELANESE VECTRA® liquid crystal polymer), and waste fiber. Fibers are commercially available from sources known by those of skill in the art, for example, E.I. Du Pont de Nemours & Company, Inc. (Wilmington, Del.), American Viscose Company (Markus Hook, Pa.), Tintoria Piana USA (Cartersville, Ga.), and Celanese Corporation (Charlotte, N.C.).

The nonwoven can be formed using fibers that are treated with chemicals (e.g., dyes (for coloring of some or all of the fibers), fire retardant chemicals (e.g., phosphates, sulfates, silicates, etc.), scent's (perfumes, etc.), topical additives such as phase change material particles, talc, carbon nanotubes, etc.). Alternatively, the nonwoven and/or the final assembly of a structure created from the nonwoven (see "koozie") can be treated after formation with chemicals (e.g., dyes, scents, fire retardant chemicals, addition of microparticles, etc.).

In particularly preferred embodiments, the nonwoven padding is made from a plurality of fibers (natural to synthetic) and includes at least two different fibers, including both binder and bulk fibers, in the mixture. In a particular application the fiber blend comprises at least 20 to 80 wt. % one natural and cellulosic fiber such as Rayon and Aerogel ranging from 1 to 7 denier, wherein the vertically lapped nonwoven basis weight in range of 50 to 600 gsm.

In preferred single layer embodiment vertically lapped nonwoven comprises 25 to 50 wt. % cellulosic or natural fiber such as rayon or aerogel, 25 to 50 wt. % synthetic fibers preferably polyester, 25 to 50% wt. binder fiber with the melting point below decomposition or melting point of bulk fibers.

In other preferred embodiment vertically lapped nonwoven comprises 10 to 50 wt. % bi-component elastomeric polyester binder fiber with melting point below 200° C.

In other preferred embodiment vertically lapped nonwoven comprises 10 to 50 wt. % of antimicrobial and/or super absorbent fiber in blend ratio.

In a particular embodiment, two or more vertically lapped nonwovens are laminated or mold together. Preferably, at least one layer comprises 20 to 70 wt. % synthetic fibers preferably polyester. In this embodiment, the upper (or skin contacting) layer is generally formed from a v-lapped polyester and functions primarily to transport sweat from the user's skin through to the underlying layer. The underlying v-lapped layer can be formed from natural fibers and synthetic fibers and functions primarily to absorb the sweat. In this embodiment, the underlying layer is preferably formed with more than 50 wt % of a natural fiber.

In a certain two-layer embodiment, one layer of vertically lapped nonwoven comprises 10 to 50 wt. % elastomeric bi-component binder fiber and 50 to 90 wt. % polyester fiber having thickness of 3 to 25 mm. The underlying layer comprises 30 to 50 wt. % elastomeric bi-component binder fiber and 50 to 70 wt. % aerogel and/or rayon fiber having thickness of 3 to 25 mm. The two layers are adhered together through a lamination or molding process.

In particular embodiments, the multilayer laminated or molded nonwoven composite has in each layer synthetic fibers with a hydrophobic or hydrophilic finish to improve wicking and absorption of moisture.

In another embodiment, a nonwoven acquisition layer is laminated to vertically lapped nonwoven comprising 20 to 70 wt. % synthetic fibers preferably polyester.

In preferred embodiments of the invention, the basis weight of each layer of vertically lapped nonwoven ranges from 50 to 350 gsm, and more preferably between 80 to 250 gsm.

Nonwovens may be made using mechanical bonding, chemical bonding, or thermal bonding techniques. In an exemplary embodiment, hot-air thermal bonding using low-melt binder fiber is employed to manufacture the nonwoven (i.e., the low-melt binder fibers melt at a lower temperature than the melting point or decomposition temperature of the fiber or fiber blend which makes up the nonwoven material and serves to hold the fibers together in the nonwoven). The low-melt binder fibers can be any of those commonly used for thermal bonding which include, but are not limited to, those that melt from 80 to 150° C. Binder fibers melt below the decomposition or melting temperature of the bulk fibers that make up the nonwoven. Examples include but are not limited to polyester and polyester copolymers. The low-melt binder fibers (and in some applications high-melt binder fibers) serve to mix readily with the other fibers of a non-woven, and to melt on application of heat and then to re-solidify on cooling to hold the other fibers in the nonwoven together. In some applications the low melt binder fibers might have a core-sheath configuration where the sheath melts on application of heat and functions to hold the other fibers of the nonwoven together.

The nonwoven can have a basis weight ranging from 0.1~5.0 oz/ft$^2$ (e.g., 0.3~2.0 oz/ft$^2$); however, the basis weight of the nonwoven can vary widely depending on the intended application and desired characteristics of the nonwoven.

Figure 1A:
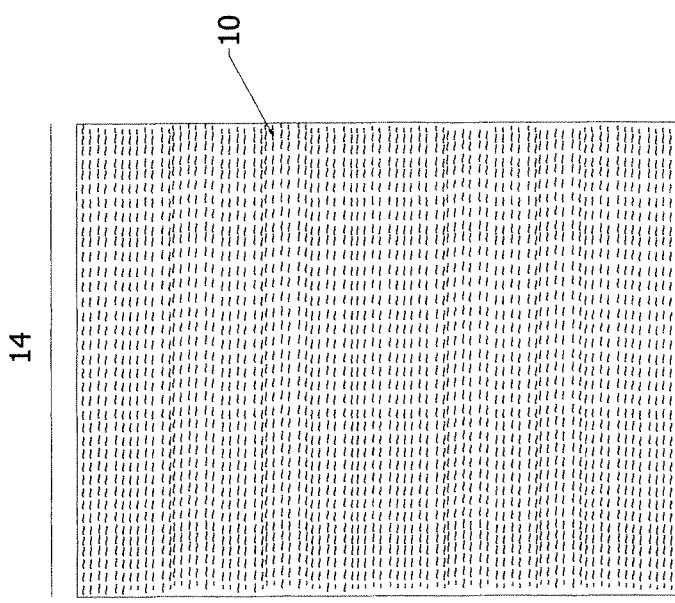
FIG. 1A is a top plan view of an exemplary lapped nonwoven material.

FIG. 1A shows a plan view of an embodiment of the invention drawn to a pad device. In this embodiment, the nonwoven 10 has height 12, width 14, and depth 16 dimensions. These dimensions can be of any size desired depending on the application. Some of the applications envisioned herein include a wrap for a tennis racket handle, or strips of nonwoven that fit inside a motorcycle or bicycle helmet (or any other piece of equipment worn by a human or animal). For example, nonwoven may have a height 12 of 2-15 inches, a width 14 of 0.5-3 inches, and a depth 15 of 0.25 to 1.5 inches.

In FIG. 1A, the entirety of the nonwoven is vertically lapped.

As can be seen from FIG. 1B when the entirety of nonwoven is vertically lapped, the top surface has channels or gaps, e.g. 22, and 24, which allow air to pass freely between portions of the nonwoven, thus providing cooling to the user's skin and allowing a ready passage of sweat into the nonwoven. In particular, FIG. 1B shows a distance 16 (i.e., thickness of the nonwoven 10) to the bottom of gap 22 which is less than the distance to the top of the gap 22. These gaps 22 and 24 can be created simply by using a V-lap machine to make the nonwoven, however, if desired, it may also be desirable to make the gaps larger, more defined, and/or more regular (as depicted in FIG. 1B) by using a molding process. Folding and bonding the nonwoven 10 together to create channels through the thickness of the nonwoven 10 can also be used as a mechanism to have the pad have some regions relatively thicker (e.g., more total non-woven material) than adjacent regions.

FIG. 1B also shows a backing material 18 which allows the non-woven to be adhered to a product of interest. For example, the backing material 18 could be a tape or glue. The tape or glue could be simply uncovered when the invention is intended to be used, or activated by exposure to heat or UV radiation. In a broad sense, the invention basically replaces foam material pads with v-lapped nonwoven material pads. The backing material 18 provides some dimensional character to the nonwoven (i.e., sized and shaped like a pad) as well as the ability to adhere the pad directly to something else, or to adhere a connector to the pad.

Figure 2:
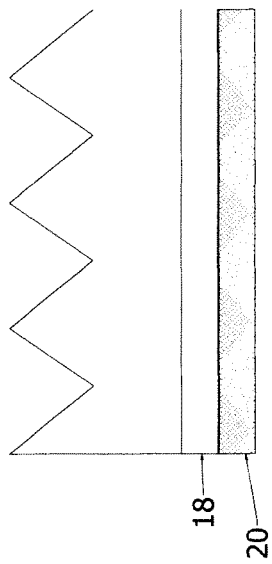
FIG. 2 is a cross-sectional side view of another embodiment of the lapped nonwoven material of FIG. 1A.

In a particularly preferred embodiment of the invention, FIG. 2 shows that a hook and loop fastener strip 20 (e.g., often referred to as VELCRO®) can be adhered to the backing material 18. The strip 20 could be either the hook or the loop portion of the hook and loop combination, and would allow the nonwoven 10 to be selectively applied to a product of interest; removed therefrom at a selected time; and then re-applied at a later time. The hook and loop strip 20 would also allow the user to "try" the nonwoven at one location in a device of interest (e.g., a helmet), and then remove it and then "try" it in another location.

Figure 3:
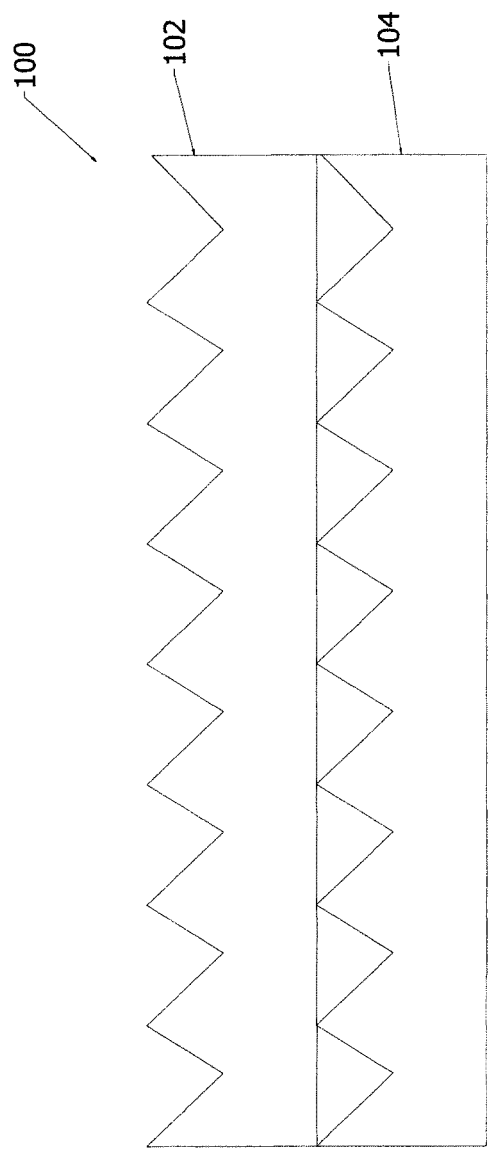
FIG. 3 is a cross-sectional side view of a multilayered pad made from two different v-lapped nonwovens.

FIG. 3 shows a multilayer pad 100 embodiment of the invention. In particular, one v-lapped non-woven 102 is adhered to or otherwise connected to an underlying v-lapped non-woven 104. The multilayer pad 100 is essentially the same as described in connection with FIGS. 1A-B, and FIG. 2, except that a top layer 102 is positioned on an underlying layer. The top layer 102 can be generally formed from a v-lapped polyester or other synthetic fiber (e.g., 20% or more synthetic and preferably 50% or more and up to 100% synthetic) and functions primarily to transport sweat from the user's skin through to the underlying layer 104. The underlying v-lapped layer 104 can be formed from natural fibers and synthetic fibers and functions primarily to absorb the sweat. In this embodiment, the underlying layer is preferably formed with more than 50 wt % of a natural fiber.

Figure 4:
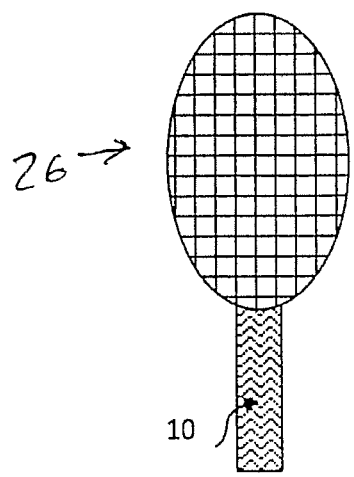
FIG. 4 is a side view of an exemplary tennis racket handle application of a lapped nonwoven material.

FIG. 4 shows an exemplary application of the invention where the nonwoven 10 is wrapped around the handle of a tennis racket 26. The nonwoven 10 can be directly and permanently applied using the backing material 18 (see FIG. 1B), or it can be removably applied using, for example, a hook and loop fastener (see FIG. 2). After the nonwoven 10 is wrapped and adhered or otherwise connected to the racket 26, the user of the tennis racket 26 will have his or her hands hold the racket over top of the nonwoven 10. The nonwoven 10 allows for sweat and moisture to better be wicked from the hands of the tennis player, and allow for air flow and a more comfortable cooling of the player's hands. This same wrapping might be used on other products such as baseball bats, ski poles for land based skis or Nordic Track™ devices, etc.

Figure 5:
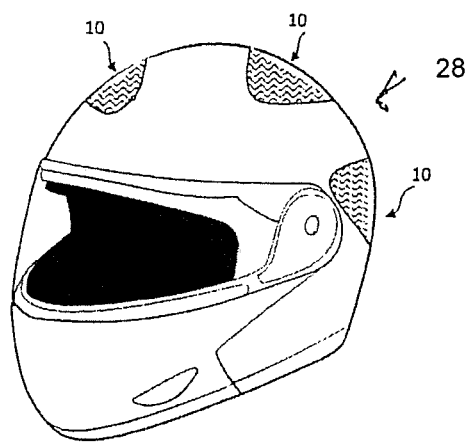
FIG. 5 is a side view of a motorcycle helmet showing in hatched lines exemplary locations inside of the helmet for a lapped nonwoven material.

Similarly, FIG. 5 shows a motorcycle helmet 28 (or bicycle helmet, fireman's helmet, construction worker's helmet, coal miner's helmet, ski helmet etc.), can have the nonwoven 10 selectively adhered or connected at different locations inside the helmet 28. As discussed above, with the configuration of FIG. 2, the helmet wearer has the option of "trying" different locations for the nonwoven 10 strips of the present invention to see which provides him or her the best fit. Preferably, the helmet user will be provided with a plurality of strips of nonwoven 10 so that he or she can stick as many strips of nonwoven 10 in the helmet 28 as desired (FIG. 5 shows three strips of nonwoven 10 for exemplary purposes, and more or less strips can be used depending on the application). As discussed above with the racket 26 of FIG. 3, the lap region(s) will allow moisture to be more easily wicked from the wearer's head. In addition, the lap region(s) will allow better air handling and cooling for the wearer.

Figure 6B:
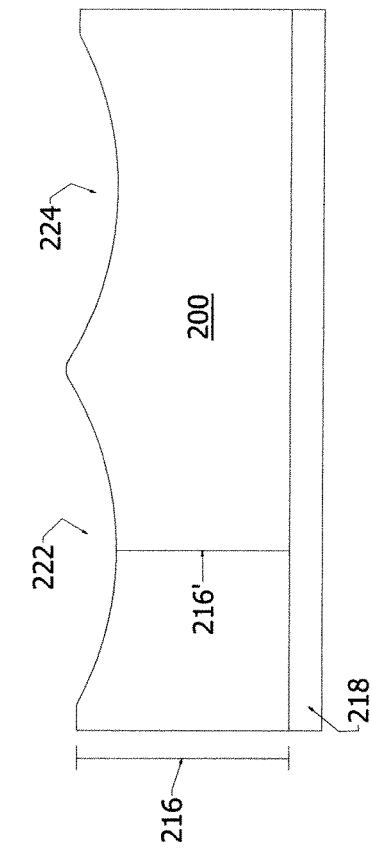
FIGS. 6A and 6B are top plan and cross-sectional side views, respectively, of an exemplary pad with a non-woven material.
Figure 7:
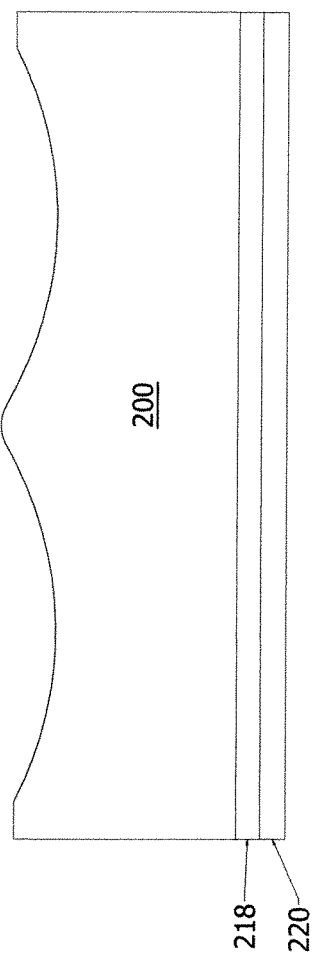
FIG. 7 shows a cross-sectional side view of the pad in FIG. 6B where a connector, such as a hook-and-loop fastener is affixed to the backing material.
Figure 6A:
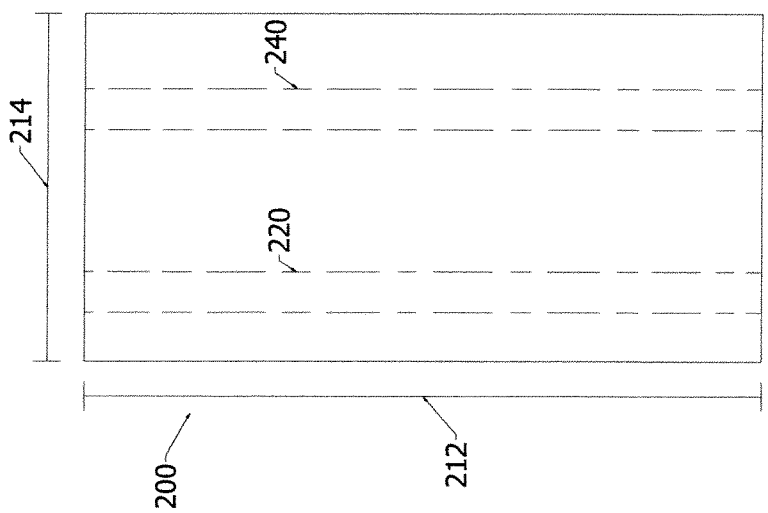

FIGS. 6A and 6B show a variation on the pad shown in FIGS. 1A and 1B. In particular, the nonwoven 200 of the pad, has height 212 and width dimensions, and includes one or more regions 220 and 240 which are have a reduced height 216' dimension compared to the surrounding regions 216. Similar to FIG. 2B, FIG. 6B shows the nonwoven 200 has a backing material 218, and FIG. 7 shows that the backing material 218 can be secured to a connector, e.g., a hook-and-loop faster strip 220.

In one embodiment, the nonwoven 200 is V-lapped in its entirety, and the regions 220 and 240 are created by molding, use of a thermoforming tool, or by other means.

In another embodiment, the nonwoven 200 is vertically lapped only at locations 220 and 240. That is, the nonwoven 200 is formed by a process and/or modified after formation, such that one or more regions, e.g., locations 220 and 240, have a different thickness than the remainder of the nonwoven 200, and those locations 220 and 240 have generally vertical lapping of the fibers making up the nonwoven as opposed to generally horizontal lapping. For example, with reference to FIG. 6B, the depth 216' of the nonwoven in location 220 is less than the depth 216 at the other locations of the nonwoven 200 (i.e., depth 216 is the full thickness, while depth 216' is the thickness at a vertical lap region).

While FIG. 6A shows the regions 220 and 240 extending vertically, it should be recognized that these regions may be oriented horizontally, or have some other regular structure or configuration which extends a significant portion of the nonwoven 10, e.g., on an angle, etc. The one or more regions (e.g., 220 and 240) allow for better air flow and moisture flow of the non-woven 200. The regions (e.g., 220 and 240) should extend the full height 212, or more than 25%, or more than 50%, or more than 60%, or more than 75% of the full height 212 of the non-woven 200.

Figure 8:
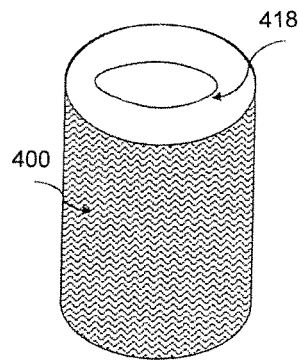
FIG. 8 is an elevational view of a "koozie" (sometimes referred to as a "cosy") configuration of a v-lapped nonwoven material padding device.

In a particular embodiment shown in FIG. 8, rather than make the nonwoven as strips or pads (as shown in FIGS. 1-7), the nonwoven 400 can be formed as a hollow cylinder (e.g., a "koozie" configuration) or other shape. After formation, the nonwoven 400 can be fit onto a product of interest (e.g., the handle of a tennis racket, a golf club, a gardening tool, a bicycle, etc.). The nonwoven 400 will be vertically lapped in its entirety or in one or more lap regions, and the lapping will be such that it extends from the inside to the outside of the koozie. The inside of the koozie device will include an adhesive 418 or an adhesive 418 plus hook and loop fastener combination.

Figure 9A:
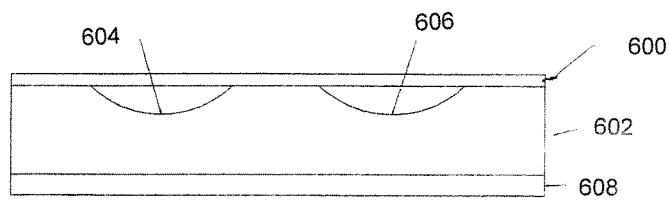
FIGS. 9A and 9B are schematic side views showing lay ups of an acquisition layer on a surface of the nonwoven pad, where
Figure 9B:
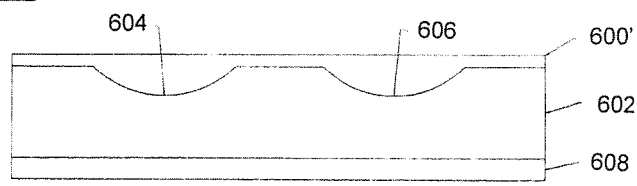

FIGS. 9A and 9B show an embodiment where an acquisition layer 600 is positioned on top of the lapped nonwovens of the present invention. In particular, FIG. 9A shows an acquisition layer 600, overlying or stretched over a nonwoven 602 of the present invention which includes one or more regions 604 and 606 that include vertically lapped fibers and which are of shallower depth than the surrounding regions, and where the nonwoven 602 is connected to a hook and loop fastener strip 608. FIG. 9B shows an embodiment where the acquisition layer 600' is itself vertically lapped in parts to match the vertically lapped regions 604 and 606 of the nonwoven 602. The acquisition layer 600 or 600' may be made from cotton (or other cellulosic material), but may also include super absorbent fiber (see, e.g., SAF fabric from Technical Absorbents as well as SAP fabric generally, fibers which can absorb 100 to 200 times the weight of the fiber in water weight). The use of an acquisition layer 600 or 600' allows for better moisture management and air permeability. This would make the nonwoven devices (e.g., pads) of the present invention more resilient, comfortable, durable, and functional, particularly in the helmet attachment application discussed above.

The vertically lapped nonwoven 602 and/or the acquisition layer 600 or 600' (in cases where an acquisition layer is employed) may be treated with an antimicrobial chemical and/or include antimicrobial threads (e.g., silver, etc.) that are antimicrobial.

Figure 10:
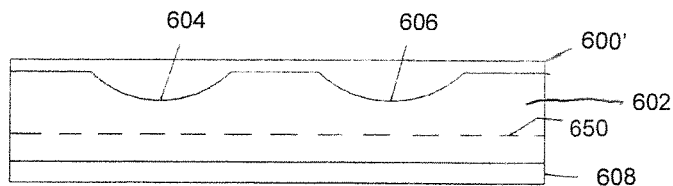
FIG. 10 is a schematic side view showing a carded consolidated web in an exemplary device.

FIG. 10 shows a variation wherein a carded consolidated web 650 can be positioned between the vertically lapped nonwoven 602 and the backing material and hook and loop connector 608. It is also contemplated that the nonwoven may be constructed from a plurality of different nonwovens, having the same or different properties.

Figure 11A:
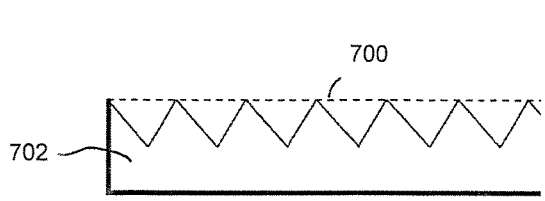
FIGS. 11A and 11B are schematic side views respectively showing an acquisition layer respectively stretched over being vertically lapped to match a nonwoven as shown in FIG. 1A.
Figure 11B:
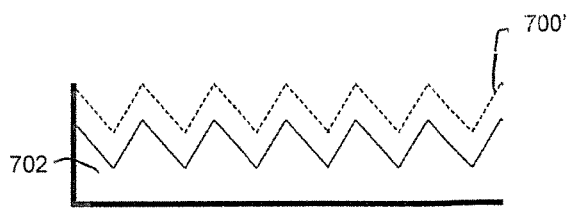

FIGS. 11A and 11B are similar FIGS. 9A and 9B. In FIGS. 11A and 11B, an acquisition layer 700 is respectively stretched over a vertically lapped nonwoven 702 (FIG. 11A) or is itself (acquisition layer 700') vertically lapped to match the nonwoven 702. The configuration of FIGS. 11A and 11B parallel the nonwoven depicted in FIGS. 1A and 1B, and include the acquisition layer 700 described in conjunction with FIGS. 9A and 9B, with the many benefits of an acquisition layer as discussed above.

While the invention has been described in terms of exemplary embodiments, those of skill in the art will recognize that the invention may be practiced with variation within the scope of the appended claims.

The invention claimed is:

1. A cushion or pad device, comprising
at least one layer of nonwoven material defining a volume with length, width, and depth dimensions, wherein the nonwoven material is vertically lapped in its entirety or in one or more lap regions and wherein the entirety of the nonwoven material is bonded; and
a backing material attached to a surface of the nonwoven, wherein the backing material is configured for directly or indirectly securing the nonwoven to a substrate,
wherein the nonwoven has an opposing surface which does not include the backing material and which is configured for being contacted by a person, wherein there are regions of the nonwoven material with differing thicknesses between the surface and the opposing surface such that the opposing surface has one or more gaps therein,
wherein the at least one layer of nonwoven material includes one or more lap regions comprising the entire depth dimension of the at least one layer on nonwoven material, wherein the one or more lap regions comprise fibers of the nonwoven being in a vertically lapped configuration, and wherein the depth dimension of the one or more lap regions is less than the depth dimension of each surrounding regions of the nonwoven.

2. The cushion or pad device of claim 1 further comprising a hook portion or a loop portion of a hook and loop connector attached to said backing material.

3. The cushion or pad device of claim 1 wherein the at least one layer of vertically lapped nonwoven material is comprised of a plurality of fibers comprising 20 to 80 wt. % natural fibers, 20 to 80 wt. % of at least one synthetic fiber, and 10 to 50 wt. % of binder fiber, wherein fiber fineness of the natural fibers and the at least one synthetic fiber is in the range of 1.4 to 7 denier.

4. The cushion or pad device of claim 3 wherein the binder fiber is bi-component elastomeric binder fiber.

5. The cushion or pad device of claim 3 wherein one of more of the natural fibers are selected from the group consisting of rayon or aerogel.

6. The cushion or pad device of claim 3 wherein the at least one synthetic fiber is or includes polyester.

7. The cushion or pad device of claim 3 wherein the binder fiber is eccentric sheath/core elastomeric polyester fiber.

8. The cushion or pad device of claim 1 wherein the at least one layer of nonwoven material includes two or more nonwoven layers molded or laminated together.

9. The cushion or pad device of claim 8 wherein a first of the two or more nonwoven layers is predominantly composed of natural fibers and wherein a second of the two or more nonwoven layer is completely or predominantly composed of synthetic fibers, and wherein the first of the two or more nonwoven layers includes the surface associated with the backing material and the second of the two or more nonwoven layers includes the opposing surface for being contacted by a person.

10. The cushion or pad device of claim 1 further comprising an acquisition layer over the opposing surface of the nonwoven for being contacted by a person.

11. The cushion or pad device of claim 10 wherein the acquisition layer is selected from the group consisting a cellulosic material and super absorbent material.

12. The cushion or pad device of claim 10 wherein the acquisition layer is stretched over the one or more gaps in the opposing surface of the nonwoven material.

13. The cushion or pad device of claim 10 wherein the acquisition layer is vertically lapped so as to match the one or more gaps in the opposing surface of the nonwoven material.

14. The cushion or pad device of claim 10 wherein the acquisition layer is laminated or molded to the opposing surface of the nonwoven material.

15. The cushion or pad device of claim 1 wherein the basis weight of each layer of nonwoven material is in a range from 50 to 300 GSM.

16. The cushion or pad device of claim 1 wherein a thickness of each layer of nonwoven material is 3 to 25 mm.

17. The cushion or pad device of claim 1 wherein the one or more lap regions extend at least 25% of the length or width dimensions of the nonwoven material.

18. The cushion or pad device of claim 1 wherein the one or more lap regions extend at least 50% of the length or width dimension of the nonwoven material.

19. The cushion or pad device of claim 1 shaped in the shape of a koozie wherein the backing material is positioned inside the koozie and the opposing surface is positioned on the outside of the koozie.

20. The cushion or pad device of claim 1 further comprising a carded consolidated web positioned in the nonwoven material.

21. The cushion or pad device of claim 1 wherein the device is configured as a strip wherein the backing material is configured for securing to a substrate.

22. The cushion or pad device of claim 21 wherein the length of the nonwoven is 2-15 inches, wherein the width of the nonwoven is 0.5-3 inches, and wherein the depth of the nonwoven is 0.25 to 1.5 inches.

23. The cushion or pad device of claim 9, wherein the synthetic fibers have a hydrophobic or hydrophilic finish.

* * * * *